United States Patent
Bates et al.

(10) Patent No.: US 9,690,917 B2
(45) Date of Patent: Jun. 27, 2017

(54) MANAGING COMPROMISED PASSWORDS

(71) Applicant: International Business Machines Corporation, Armonk, NY (US)

(72) Inventors: Cary L. Bates, Rochester, MN (US); Lee N. Helgeson, Rochester, MN (US); Justin K. King, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 14/285,842

(22) Filed: May 23, 2014

(65) Prior Publication Data
US 2015/0339470 A1 Nov. 26, 2015

(51) Int. Cl.
*G06F 21/32* (2013.01)
*G06F 21/44* (2013.01)
*H04W 12/06* (2009.01)
*G06F 21/36* (2013.01)
*H04W 88/02* (2009.01)

(52) U.S. Cl.
CPC .............. *G06F 21/32* (2013.01); *G06F 21/36* (2013.01); *G06F 21/44* (2013.01); *H04W 12/06* (2013.01); *G06F 2221/2101* (2013.01); *H04W 88/02* (2013.01)

(58) Field of Classification Search
CPC .. G06F 21/32; G06F 21/44; G06F 2221/2101; H04W 12/06; H04W 88/02; H04L 63/083
See application file for complete search history.

(56) References Cited

U.S. PATENT DOCUMENTS

| | | | |
|---|---|---|---|
| 2005/0198537 A1* | 9/2005 | Rojewski | G06F 21/46 726/19 |
| 2011/0055931 A1 | 3/2011 | Lurey et al. | |
| 2011/0088085 A1* | 4/2011 | Novak | G06F 21/31 726/7 |
| 2013/0047237 A1 | 2/2013 | Ahn et al. | |
| 2013/0104205 A1* | 4/2013 | Hsi | G06F 21/36 726/6 |
| 2014/0109200 A1* | 4/2014 | Tootill | G06F 21/32 726/5 |
| 2015/0254444 A1* | 9/2015 | Herger | G06F 21/32 726/19 |
| 2015/0254452 A1* | 9/2015 | Kohlenberg | H04L 63/083 726/6 |

(Continued)

FOREIGN PATENT DOCUMENTS

JP 09054862 A 2/1997

*Primary Examiner* — Techane Gergiso
(74) *Attorney, Agent, or Firm* — Jay Wahlquist

(57) ABSTRACT

A system and computer implemented method for determining compromised passwords is disclosed. The method may include displaying, in a first set of positions, a set of entry keys of a device. The method may include collecting a first set of tracking data including the first set of positions for entry of a first password. The method may also include displaying the set of entry keys of the device in a second set of positions. The method may also include determining a second password based on the second set of positions and entry of the first password. The method may also include determining whether the second password was entered into the device.

20 Claims, 4 Drawing Sheets

(56) References Cited

U.S. PATENT DOCUMENTS

2015/0286816 A1* 10/2015 Adler .................... H04L 63/083
                                                            726/6
2016/0247000 A1*  8/2016 Jiang ....................... G06F 3/041
2016/0359865 A1* 12/2016 Jiang ..................... H04L 63/083

* cited by examiner

MANAGING COMPROMISED PASSWORDS

BACKGROUND

The present disclosure relates to computer systems, and more specifically, to computer security methods for determining compromised passwords.

Passwords are a widely used method of authentication used by computers and mobile devices. A password that becomes compromised can pose challenges associated with protecting user data. As the use of passwords for authentication increases, the need for managing passwords may also increase.

SUMMARY

Aspects of the present disclosure, in certain embodiments, are directed toward determining compromised passwords. In certain embodiments, the method may include displaying, in a first set of positions, a set of entry keys of a device. In certain embodiments, the method may include collecting a first set of tracking data including the first set of positions for entry of a first password. In certain embodiments, the method may include displaying the set of entry keys of the device in a second set of positions. In certain embodiments, the method may include determining a second password based on the second set of positions and entry of the first password. In certain embodiments, the method may include determining whether the second password was entered into the device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
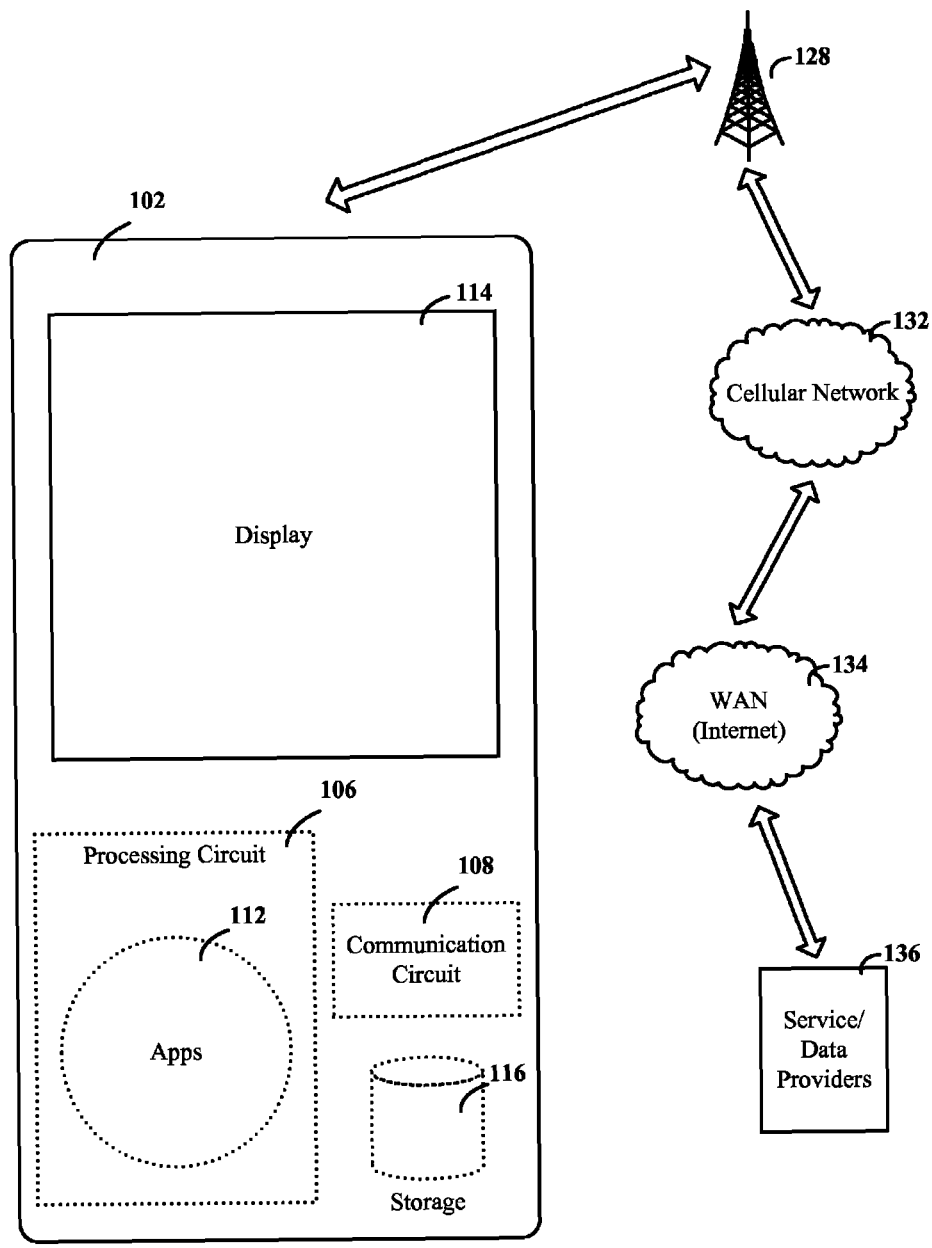
FIG. 1 illustrates an example system of communication interfaces according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and method for determining compromised passwords. More particular aspects relate to determining whether a second password (e.g., a "baited" password) was entered into the device. The method may include displaying, in a first set of positions, a set of entry keys of a device. The method may include collecting a first set of tracking data for entry of a first password. The first set of tracking data may include the first set of positions. The method may include displaying the set of entry keys of the device in a second set of positions. The method may also include determining the second password based on the second set of positions and entry of the first password. The method may also include determining whether the second password was entered into the device.

Passwords are a widely used method of authentication used by computers and mobile devices for verifying that a user is authorized to access content. While hackers develop ever complex methods of identifying flaws in security systems, an observer simply looking over the shoulder of a user as he or she enters a password is still a common way in which security can be compromised. To counter this, mobile devices and other security systems (smart phones, ATMs, etc.) have begun to employ methods to obfuscate the password entered into the device, such as randomizing the position of the entry keys of the mobile device or security system. Additionally, such methods may lead an observer of password entry into such a system to believe that the password is something other than the real password (e.g., a "baited password), based on the positions they saw touched on the screen of the mobile device or security system. Accordingly, aspects of the present disclosure are directed toward determining when such "baited" passwords are entered into a device, and implementing a security action to protect the device itself as well as users in the vicinity of the compromised password. The present disclosure may provide benefits associated with password security.

Aspects of the present disclosure relate to various embodiments of a system and method for determining compromised passwords. More particular aspects relate to determining whether a "baited" password was entered into the device. The method and system may work on a number of devices and operating systems. Aspects of the present disclosure include displaying, in a first set of positions, a set of entry keys of a device. The entry keys may, for instance, be displayed on the screen of a mobile device, such as a cell phone, smart phone, or tablet. The first set of positions may, in certain embodiments, be substantially randomized, and not arranged in any particular order. The method may include collecting, by a security application, identification information from a user. The security application may then determine whether the user of the device corresponds with a first user profile. In response to determining that the user of the device corresponds with the first user profile, the method may include displaying the set of entry keys in the first set of positions.

Aspects of the present disclosure relate to collecting a first set of tracking data for entry of a first password. In certain embodiments, the first set of tracking data may include the first set of positions for entry of a first password. The first set of tracking data may include time and date information recording when the first password was entered. In certain embodiments, the tracking data may also include location information (e.g., GPS coordinates) of where the device was at the time that the first password was entered.

Aspects of the present disclosure relate to displaying the set of entry keys of the device in a second set of positions. In certain embodiments, the second set of positions may be arranged or organized in a logical fashion (e.g., ascending numerical order, alphabetical order). In certain embodiments, the method may include storing password data including a set of passwords entered into the device in a password management database. The second set of positions may be determined based on the password data including the set of passwords entered into the device. In certain embodiments, the method may include collecting, by a security application, identification information from a user. The security application may be configured to determine that the user of the device corresponds to an unidentified user profile (e.g., an unknown user). In response to determining that the user of the device corresponds with the identified user profile, the method may include displaying the set of entry keys in the second set of positions. In certain embodiments, collecting identification information from the user may include capturing a first set of images of a head of the user. The method may include using facial recognition techniques to compare the first set of images of the head of the user with a second set of images of the first user profile.

Aspects of the present disclosure relate to determining a second password based on the second set of positions and entry of the first password. The second password may be a likely password that an observer of entry of the first password in the first set of positions is likely to enter into the device. For example, the position of the entry keys used to enter the second password (in the second set of positions) may correspond to the position of the entry keys used to enter the first password (in the first set of positions).

Aspects of the present disclosure relate to determining whether the second password was entered into the device. The second password may be entered using the entry keys displayed on the screen of the device. In certain embodiments, the method may include collecting a second set of tracking data including time data and location data for entry of the second password. In response to determining that the second password was entered into the device, the method may include selecting a security action based on the time data and location data of the second set of tracking data. In certain embodiments, the security action may include enabling a tracking application configured to transmit global-positioning coordinates to a security management server.

FIG. 1 illustrates an example system of communication interfaces according to embodiments. A receiving device 102 (e.g., smart phone) includes a communication circuit 108. The communication circuit 108 allows the receiving device 102 to access data using cellular network 132. For example, the receiving device can interface with a local cellular tower 128. The receiving device can then retrieve data using a cellular data connection that has been established in the course of the interaction. The particular type protocol used for the cellular data connection is not limiting, but can include cellular data connections using code division multiple access (CDMA), time division multiple access (TDMA), orthogonal frequency division multiplexing (OFDM) or other communication protocols.

In certain embodiments, the receiving device 102 may request data that is made available over a wide area network (WAN) 134, such as the global Internet. For instance, service/data providers 136 can provide services such as websites, e-mail, or audio/video content. The receiving device 102 may send and receive data from such service providers 136. In other embodiments, the receiving device 102 can each communicate directly with another receiving device using the communication circuit 108 for a wireless interface. Other than communicating with the cellular network 128, the communication circuit 108 can use, but is not limited to, near field communications (NFC), WiFi/IEEE 802.11, Bluetooth/IEEE 802.15, or infrared. Accordingly, embodiments may be directed toward the use of either a point-to-point connection or a connection through a local area network (LAN).

A processing circuit 106 may be configured to execute at least one software module or application (apps) 112. The processing circuit 106 can include one or more computer processors, logic circuitry, discrete circuit components and combinations thereof. The software applications 112 can be configured to, in combination with the processing circuit 106, put into operation the methodology described according to aspects of the disclosure. For instance, the software applications 112 can provide an interface or display 114 including a set of entry keys to receive entry of one or more passwords. Aspects of the disclosure (e.g., aspects associated with the software applications 112) can be stored in a memory circuit as part of a database/storage 116.

Figure 2:
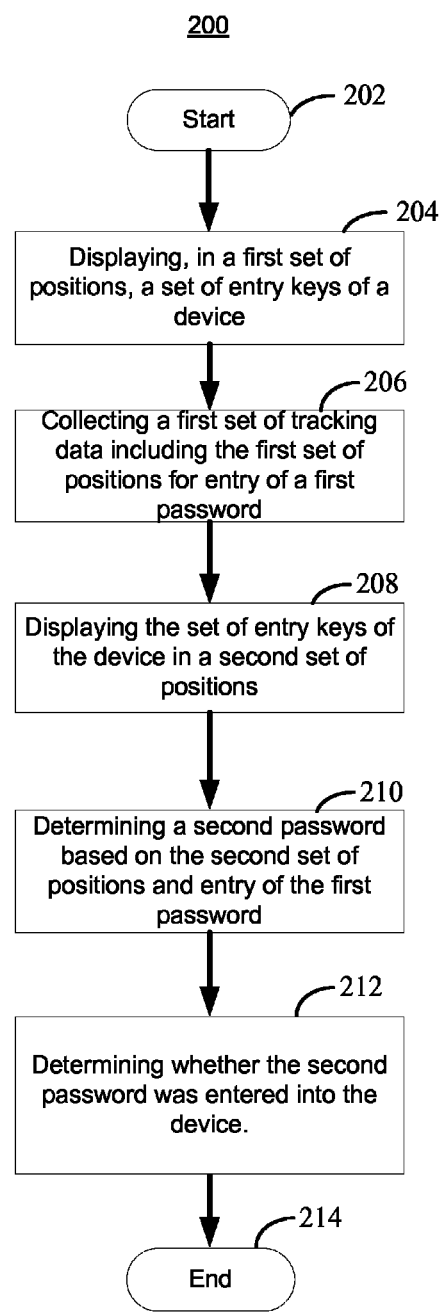
FIG. 2 is a flowchart illustrating a method for determining compromised passwords; according to embodiments.

FIG. 2 is a flowchart illustrating a method 200 for determining compromised passwords, consistent with embodiments of the present disclosure. Aspects of FIG. 2 are directed toward determining whether a second password (e.g., a "baited password") was entered into a device. The method 200 may begin at block 202 and end at block 214. Consistent with various embodiments, the method 200 can include a displaying block 204, a collecting block 206, a displaying block 208, a first determining block 210, and a second determining block 212.

Consistent with various embodiments, at block 204 the method can include displaying, in a first set of positions, a set of entry keys of a device. The set of entry keys may be configured to receive entry of a password to unlock the device for a user. In certain embodiments, the device may be a mobile device such as a smart phone, cell phone, or tablet. In certain embodiments, the device may be a security system entry pad or other type of computer system configured to accept input through a set of entry keys. In certain embodiments, the device may correspond with receiving device 102 of FIG. 1. The set of entry keys may be a set of graphical user interface (GUI) elements or button widgets configured to receive input from a user, and displayed on a screen of the device. As an example, the device may be a smart phone, and the set of entry keys may, in certain embodiments, be a set of GUI elements prompting the user for entry of a password to unlock the device. In certain embodiments, each entry key of the set of entry keys may correspond to a symbol, number, letter, or character used to allow a user to enter a password into the device. For example, the entry keys may be the numbers 0-9. In certain embodiments, the first set of positions may be substantially randomized. More particularly, the device may use an algorithm (e.g., a random number generator) configured to arrange the entry keys in a substantially random set of positions.

Aspects of the present disclosure, in certain embodiments, are directed toward displaying the set of entry keys in the first set of positions in response to determining that the user of the device is the primary user. Accordingly, in certain embodiments, the method 200 can include verifying whether the user of the device is the primary user, or owner, of the device. Verifying whether the user of the device is the primary user or owner can be implemented using one of a number of methods. In certain embodiments, the user may be identified using facial recognition software. In certain embodiments, the device may track the placement and pressure of the fingers of the user, and determine whether the placement and pressure of the fingers match that of the primary user of the device. In certain embodiments, the device may require that a specific button combination, hidden button, or other technique be performed in order to verify the owner of the device. Additionally, in certain embodiments, the device may be equipped with accelerometers, and configured to recognize a motion signature (e.g., a particular manner of moving the device) in order to verify the owner of the device. Other methods of verifying whether the user of the device is the primary user or owner of the device are also possible.

Accordingly, in certain embodiments, the device may include using a security application or widget to collect identification information from a user of the device. In certain embodiments, the security application may be configured to run in the background of the device, and activate prior to entry of a password. For example, in certain embodiments, the security application may activate when a user awakens their device from a standby or sleep mode (e.g., when a plane lands after descent). The security application can be configured to collect identification information from a user and determine whether the user of the device corresponds with a first user profile. The identification information can be one of a number of different types, and can be collected in a number of different ways. For example, as described herein, collecting the identification information may include recording the placement (e.g., relative distance between each finger) and pressure (e.g., force of the grip) of the fingers of the user on the device, monitoring for a motion signature, accepting a button combination, or capturing an image of the facial features of the user. In certain embodiments, the collected identification information may be compared with the first user profile. The first user profile may store information about an individual that can be used to identify the primary user of the device. For example, the first user profile may store information regarding the placement and pressure of the fingers of the primary user, captured images of the facial features of the primary user, registered button combinations and motion signatures, and other information that could be used to identify the primary user. In response to determining that the user of the device corresponds with the first user profile (e.g., is the primary user), the method 200 can include displaying the set of entry keys in the first set of positions.

As an example, in certain embodiments, collecting identification information from the user may include capturing a first set of images of a head of the user. In certain embodiments, the device may be equipped with a camera configured to capture the first set of images. Accordingly, the device may then be configured to use facial recognition techniques to compare the first set of images of the head of the user with a second set of images of the first user profile. The second set of images may be a stored set of images of the primary user, and can be used to verify whether the user of the device is the primary user.

Consistent with various embodiments, at block 206 the method 200 can include collecting a first set of tracking data including the first set of positions for entry of a first password. In certain embodiments, the first password may be a sequence of numbers, letters, symbols, or other characters entered using the set of entry keys of the device. As an example, in certain embodiments, the set of entry keys may be the digits 0 through 9, and the first password may be 1-4-3. The first set of tracking data may include the time and date at which the first password was entered. For instance, in response to entry of the password 1-4-3 using the entry keys of the device, the method 200 can include collecting tracking data indicating that the password was entered at 4:58 PM on Mar. 23, 2016. In certain embodiments, the tracking information can also include information regarding the location of the user who entered the password. As an example, in response to entry of the password 1-4-3, the method 200 can include collecting tracking data indicating that the password was entered by a user in Rochester, Minn. More particularly, the tracking data can also include latitude and longitude coordinates of the user in response to entry of the first password. In certain embodiments, the tracking data may also include the first set of positions at the time of entry of the first password, as well as the specific positions of the entry keys used to enter the first password (e.g., the center key of each row, etc.).

Consistent with various embodiments, at block 208 the method 200 can include displaying the set of entry keys of the device in a second set of positions. As described herein, the set of entry keys may be configured to receive entry of a password to unlock the device for a user. In certain embodiments, the second set of positions may be a logical arrangement of the set of entry keys. For example, in certain embodiments, the entry keys may be the numbers 0 through 9, and may be arranged in ascending order. In certain embodiments, the entry keys 1-9 may be arranged in ascending order, with the 0 key placed at the end, or below, the rest of the entry keys (e.g., as on certain mobile phone keypads). Other arrangements of the second set of positions are also possible. (See FIG. 3.)

Aspects of the present disclosure, in certain embodiments, are directed toward displaying the set of entry keys in the second set of positions in response to determining that the user of the device is not the primary user, or owner of the device. Accordingly, in certain embodiments, the method 200 can include determining that the user of the device is not the primary user of the device. As described herein, the method 200 can include using a security application to collect identification information from a user. In certain embodiments, the user may be a potentially nefarious user attempting to gain access to information stored on the device. The security application and the identification information that may be collected from the user can substantially correspond with that described herein regarding verifying that the user is the primary user of the device. For example, collecting the identification information from the user can include capturing images of the head of the user, monitoring the placement and pressure of the fingers of the user on the device, receiving a specific button combination or motion signature and the like. The method 200 can also include determining, by the security application, that the user of the device corresponds to an unidentified user profile (e.g., is not the primary user of the device). Determining that the user of the device corresponds to the unidentified user profile can include comparing the collected identification information with identification information of the first user profile, and ascertaining that the collected identification information does not substantially match that of the first user profile. As an example, an image of the first set of images (e.g., that of the primary user) may be a face of a woman with dark hair and brown eyes, and an image collected for another user (e.g., the potentially nefarious user) may be of a man with red hair and green eyes. Accordingly, the method 200 may determine that the user is not the primary user, and the set of entry keys may be displayed in the second set of positions.

Consistent with various embodiments, at block 210 the method 200 can include determining a second password based on the second set of positions and entry of the first password. In certain embodiments, the second password may be a likely password that an observer of entry of the first password in the first set of positions is likely to enter into the device. Put differently, the position of the entry keys of the second password may correspond to the position of the entry keys of the first password. (See FIG. 3 for additional explanation and examples.)

Consistent with various embodiments, at block 212 the method 200 can include determining whether the second password was entered into the device. In certain embodiments, determining whether the second password was entered into the device can include receiving a password entry using the set of entry keys. The method 200 can then, in certain embodiments, include comparing the password entry to the second password determined at block 210. Aspects of the present disclosure, in certain embodiments, are directed toward implementing a security action in response to determining entry of the second password. More particularly, in certain embodiments, the method 200 can include collecting a second set of tracking data including time data and location data for entry of the second password. As described herein, the time data can include the time and date of the second password entry (e.g., 4:29 PM, Oct. 21, 2015), and the location data can include GPS coordinates for a particular location (e.g., Hill Valley, Calif.) In response to determining that the second password was entered into the device, the method 200 can include selecting a security action based on the time data and location data of the second set of tracking data. As an example, in certain embodiments, the security action can include enabling a tracking application configured to transmit global positioning coordinates of the device and the time of the second password entry to a security management server. The security management server may then be configured to transmit a notification to other mobile device users in the vicinity of the second password entry to warn them of a potential incident. A variety of other security actions are also possible. For example, in certain embodiments, the device may disable itself to prevent data theft by the potentially nefarious user. In certain embodiments, the device may capture an image of the head of the potentially nefarious user, and transmit it to a secure server, personal account, email address, or phone number. In certain embodiments, the device may fake a successful login to mislead the potentially nefarious user, and collect additional information (e.g., capture images of the user's face, etc.) while not divulging confidential data. Other security actions are also possible.

Figure 3:
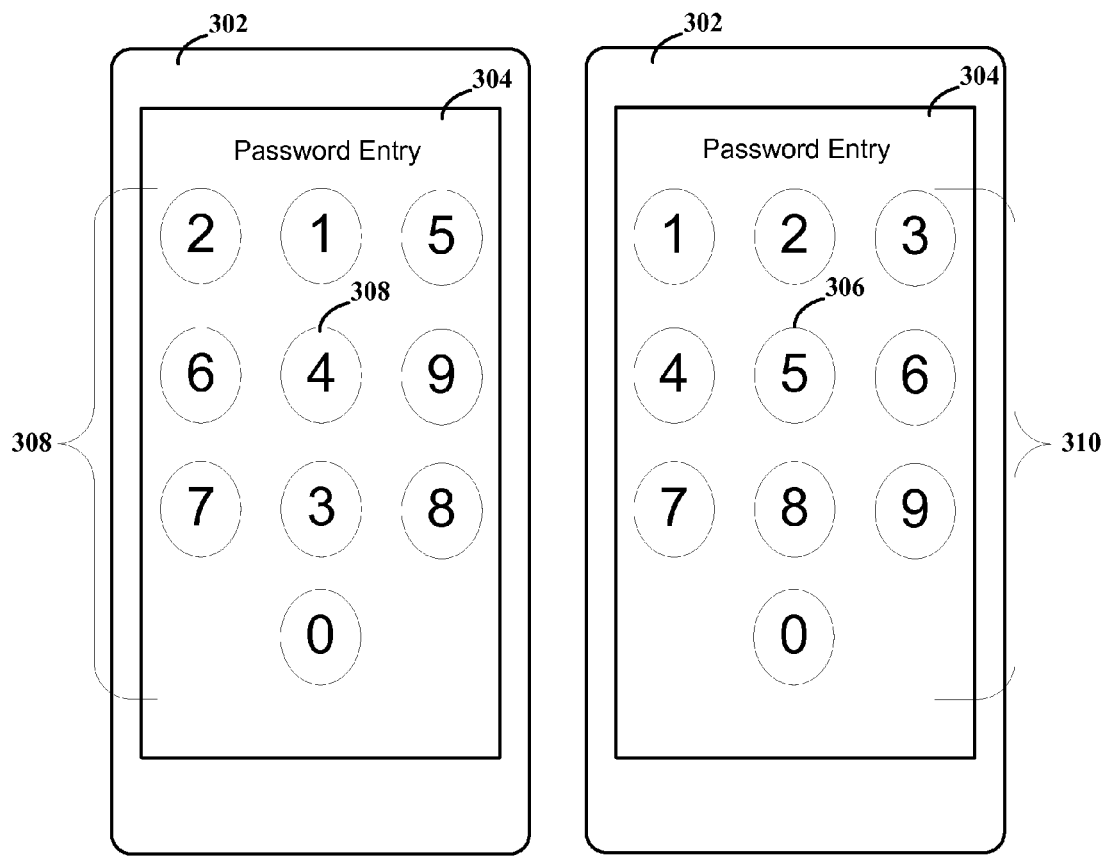
FIG. 3 is an example mobile device and entry keys, according to embodiments.

FIG. 3 is an example mobile device and entry keys, consistent with embodiments of the present disclosure. Aspects of FIG. 3 are directed toward a mobile device with a set of entry keys in a first set of positions and a second set of positions for determining compromised passwords. FIG. 3 may include a mobile device 202 having a password entry interface 304. The password entry interface 304 may display a set of entry keys 306. Consistent with various embodiments of the present disclosure, the set of entry keys may be arranged in a first set of positions 308 and a second set of positions 310.

Consistent with various embodiments, FIG. 3 illustrates the set of entry keys in the first set of positions 308 and the second set of positions 310. As described herein, the first set of positions 308 may be substantially randomized (e.g., the entry keys are arranged with no particular pattern or logic). The second set of keys may, in certain embodiments, be arranged similarly to the keys on a number pad or mobile phone keypad. Other configurations are also possible. The password entry interface 304 may be configured to receive entry of one or more passwords using the entry keys 306.

In certain embodiments, the arrangement of the entry keys 306 in the first set of positions 308 may be determined using an algorithm configured to utilize previously determined baited passwords. The first set of positions 308 may be generated such that the entry keys corresponding to previously determined baited passwords are not in close proximity to one another. More particularly, the entry keys corresponding to previously determined baited passwords may not be placed within one key (e.g., adjacent) to each other. Consider, for instance, that the first password of a primary user of the mobile device 302 is 5-9-8. The baited password may be determined to be 3-6-9. Accordingly, when the first set of positions 308 is generated on subsequent occasions, it could be generated such that combinations where 3-6-9 appear in a column (e.g., as in the second set of positions 310) are avoided. Such a configuration may provide benefits associated with avoiding accidental entry of the baited password.

In certain embodiments, the arrangement of the entry keys 306 in the first set of positions 308 may be generated after each key entry of a password. For example, in certain embodiments, a primary user with a first password of 1-4-3 may enter the first digit of the password (e.g., 1) using the password entry interface 304. Accordingly, the first set of positions 308 may then be rearranged before entry of the second digit of the first password.

Consider the following example. A primary user of the mobile device 302 may be waiting for a flight at an airport departure gate, and withdraw the mobile device 302 from a pocket. As described herein, the mobile device 302 may verify that the user of the mobile device 302 is the primary user. For example, the mobile device 302 may verify that the user of the mobile device 302 is the primary user by capturing an image of the face of the user, and confirming that the image matches a stored image of the face of a first user profile. Accordingly, the mobile device 302 may present the password entry interface 304 with the entry keys 306 in the first set of positions 308. The user may enter a first password of 1-4-3 using the entry keys (e.g., pressing the button in the center position of each row). The mobile device 302 may then determine a second, or "baited" password. The baited password may be based on the first set of positions and the position of the entry keys used to enter the first password. In certain embodiments, the baited password may be the password that the positions of the entry keys used to enter the first password correspond to when the entry keys are in the second set of positions. For example, in the present example, the baited password may be determined to be 2-5-8, as the positions of the entry keys used to enter the first password (the center key of each row) correspond to these positions when the entry keys are in the second set of positions.

An observer sitting nearby may see the position of the keys used to enter the first password (e.g., the center key of each row) without seeing the first password (1-4-3) itself. At a later time, the primary user may rise from his or her seat to use the bathroom, forgetting the mobile device 302 on the chair. The observer may pick up the mobile device 302. In certain embodiments, the mobile device 302 may capture an image of the face of the observer, and compare it to the stored image of the primary user. In response to determining that the face of the observer does not match that of the primary user, the mobile device 302 may present the password entry interface 304 with the entry keys 306 in the second set of positions 310. In certain embodiments, the observer may enter the second password (e.g., the password he or she thought he saw the primary user enter) into the mobile device 302. Accordingly, the mobile device 302 may determine that the second password has been entered, and select a security action. The security action may, for example, include sending a warning notification to a secure management server with information regarding the time and location of the second password entry. The secure management server may then transmit warning notifications to other mobile device users in the airport to inform them of the compromised password.

Figure 4:
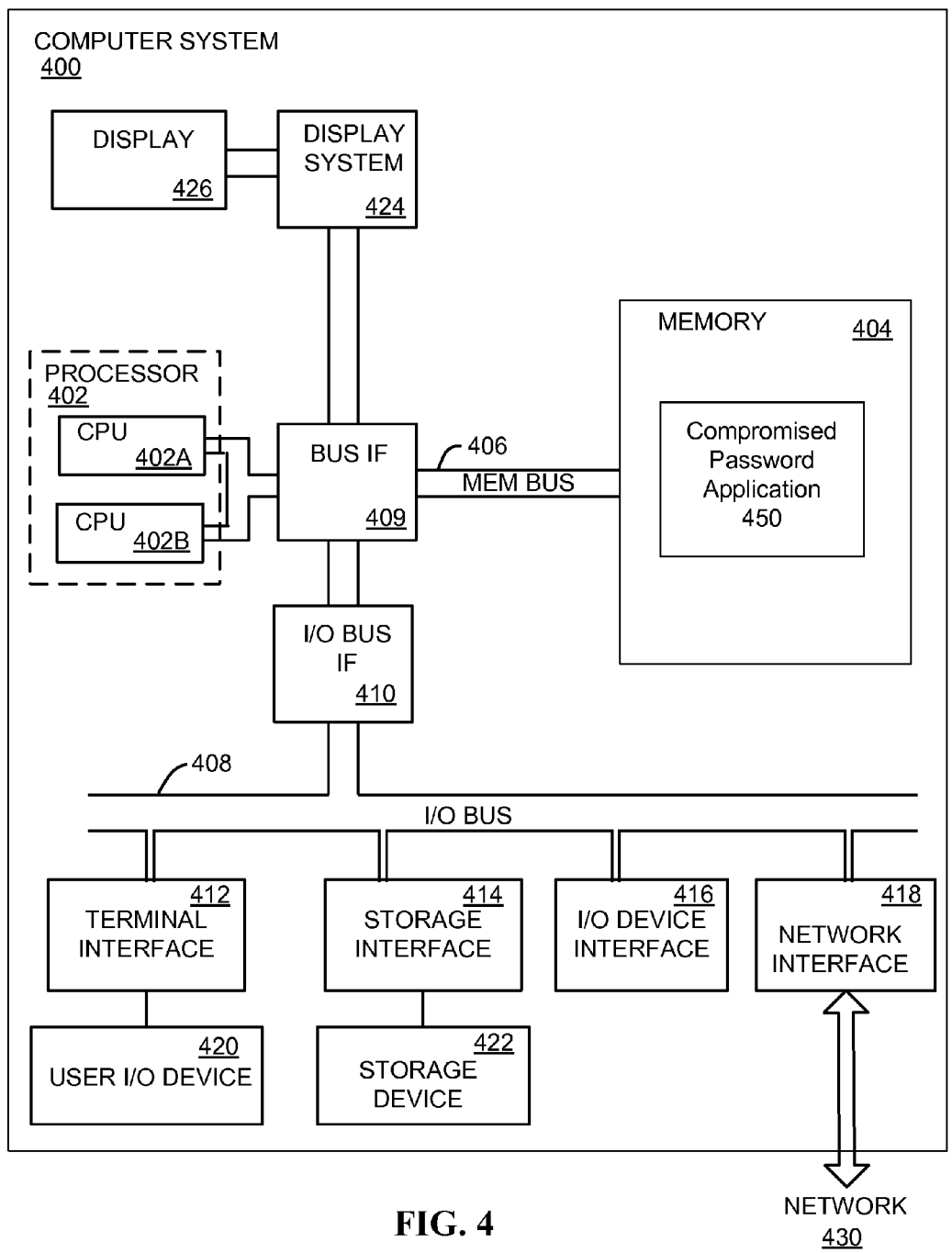
FIG. 4 depicts a high-level block diagram of a computer system for implementing various embodiments, according to embodiments.

FIG. 4 depicts a high-level block diagram of a computer system 400 for implementing various embodiments. The mechanisms and apparatus of the various embodiments disclosed herein apply equally to any appropriate computing system. The major components of the computer system 400 include one or more processors 402, a memory 404, a terminal interface 412, a storage interface 414, an I/O (Input/Output) device interface 416, and a network interface 418, all of which are communicatively coupled, directly or indirectly, for inter-component communication via a memory bus 406, an I/O bus 408, bus interface unit 409, and an I/O bus interface unit 410.

The computer system 400 may contain one or more general-purpose programmable central processing units (CPUs) 402A and 402B, herein generically referred to as the processor 402. In embodiments, the computer system 400 may contain multiple processors; however, in certain embodiments, the computer system 400 may alternatively be a single CPU system. Each processor 402 executes instructions stored in the memory 404 and may include one or more levels of on-board cache.

In embodiments, the memory 404 may include a random-access semiconductor memory, storage device, or storage medium (either volatile or non-volatile) for storing or encoding data and programs. In certain embodiments, the memory 404 represents the entire virtual memory of the computer system 400, and may also include the virtual memory of other computer systems coupled to the computer system 400 or connected via a network. The memory 404 can be conceptually viewed as a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the various programs, modules and data structures for processing data transfers as discussed herein. For instance, the memory 404 can store a compromised password application 450. In embodiments, compromised password application 450 may include instructions or statements that execute on the processor 402 or instructions or statements that are interpreted by instructions or statements that execute on the processor 402 to carry out the functions as further described below. In certain embodiments, the compromised password application 450 is implemented in hardware via semiconductor devices, chips, logical gates, circuits, circuit cards, and/or other physical hardware devices in lieu of, or in addition to, a processor-based system. In embodiments, the compromised password application 450 may include data in addition to instructions or statements.

The computer system 400 may include a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In one embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be on board an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the computer system 400, and may receive output data via the user output devices. For example, a user interface may be presented via the user I/O device 420, such as displayed on a display device, played via a speaker, or printed via a printer.

The storage interface 414 supports the attachment of one or more disk drives or direct access storage devices 422 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 422 may be implemented via any type of secondary storage device. The contents of the memory 404, or any portion thereof, may be stored to and retrieved from the storage device 422 as needed. The I/O device interface 416 provides an interface to any of various other I/O devices or devices of other types, such as printers or fax machines. The network interface 418 provides one or more communication paths from the computer system 400 to other digital devices and computer systems; these communication paths may include, e.g., one or more networks 430.

Although the computer system 400 shown in FIG. 4 illustrates a particular bus structure providing a direct communication path among the processors 402, the memory 404, the bus interface 409, the display system 424, and the I/O bus interface unit 410, in alternative embodiments the computer system 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 410 and the I/O bus 408 are shown as single respective units, the computer system 400 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 may be implemented as a desktop computer, portable computer, laptop or notebook computer, tablet computer, pocket computer, telephone, smart phone, or any other suitable type of electronic device.

FIG. 4 depicts several major components of the computer system 400. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for determining compromised passwords comprising:
    displaying a first keypad on a screen of a device, the first keypad comprising a set of entry keys of the device displayed in a first set of positions on the screen of the device, wherein each entry key corresponds to a symbol, a number, a letter, or a character;
    collecting a first set of tracking data including respective first positions, from the first set of positions, of entry keys used for entry of a first password;
    displaying a second keypad on the screen of the device, the second keypad comprising the set of entry keys of the device displayed in a second set of positions on the screen of the device;
    determining a second password based on entry keys displayed in the second set of positions that correspond with the respective first positions of entry keys used for entry of the first password;
    determining whether the second password was entered into the device; and
    implementing a security action in response to determining entry of the second password.

2. The method of claim 1, further comprising:
    collecting, by a security application, identification information from a user;
    determining, by the security application, based on the identification information, that the user of the device corresponds with a first user profile; and
    displaying, responsive to determining that the user of the device corresponds with the first user profile, the set of entry keys in the first set of positions.

3. The method of claim 2, further comprising:
    determining, by the security application, based on the identification information, that the user of the device corresponds to an unidentified user profile; and
    displaying, responsive to determining that the user of the device corresponds with the unidentified user profile, the set of entry keys in the second set of positions.

4. The method of claim 3, wherein collecting identification information from the user includes:
    capturing a first set of images of a head of the user; and
    comparing, using facial recognition techniques, the first set of images of the head of the user with a second set of images of the first user profile.

5. The method of claim 1, wherein the first set of tracking data includes time data and location data, and wherein the second password is a likely password that an observer of entry of the first password in the first set of positions is likely to enter into the device.

6. The method of claim 1, further comprising:
    collecting a second set of tracking data including time data and location data for entry of the second password; and
    selecting, in response to determining that the second password was entered into the device, the security action based on the time data and location data of the second set of tracking data.

7. The method of claim 6, wherein the security action includes enabling a tracking application configured to transmit global-positioning coordinates to a security management server.

8. The method of claim 6, further comprising:
    identifying, based on the second set of tracking data, potentially targeted users within a threshold distance of an entry location of the second password; and
    alerting, using a phone communication, the potentially targeted users of the entry of the second password.

9. The method of claim 8, further comprising:
    identifying, using a wireless provider database, individuals sharing a wireless provider plan with the potentially targeted users; and
    alerting, using a phone communication, the identified individuals of the entry of the second password.

10. The method of claim 1, further comprising:
    storing password data including a set of passwords entered into the device in a password management database; and
    wherein the second set of positions is determined based on the password data including the set of passwords entered into the device.

11. A system for determining compromised passwords comprising:
    a first displaying module to display a first keypad on a screen of a device, the first keypad comprising a set of entry keys of the device displayed in a first set of positions on the screen of the device, wherein each entry key corresponds to a symbol, a number, a letter, or a character;
    a collecting module to collect a first set of tracking data including respective first positions, from the first set of positions, of entry keys used for entry of a first password;
    a second displaying module to display a second keypad on the screen of the device, the second keypad comprising the set of entry keys of the device displayed in a second set of positions on the screen of the device;
    a first determining module to determine a second password based on entry keys displayed in the second set of positions that correspond with the respective first positions of entry keys used for entry of the first password; and a second determining module to determine whether the second password was entered into the device and implement a security action in response to determining entry of the second password.

12. The system of claim 11, further comprising:
a collecting module configured to collect, using a security application, identification information from a user;
a determining module configured to determine, based on the identification information, that the user of the device corresponds with a first user profile; and
a displaying module configured to display, responsive to determining that the user of the device corresponds with the first user profile, the set of entry keys in the first set of positions.

13. The system of claim 12, further comprising:
determining, by the determining module, based on the identification information, that the user of the device corresponds to an unidentified user profile; and
displaying, by the displaying module, responsive to determining that the user of the device corresponds with the unidentified user profile, the set of entry keys in the second set of positions.

14. The system of claim 13, wherein collecting identification information from the user includes:
a capturing module configured to capture a first set of images of a head of the user; and
a comparing module configured to compare, using facial recognition techniques, the first set of images of the head of the user with a second set of images of the first user profile.

15. A computer program product comprising a computer readable storage medium having a computer readable program stored therein, wherein the computer readable program, when executed on a first computing device, causes the first computing device to:
display a first keypad on a screen of a device, the first keypad comprising a set of entry keys of the device displayed in a first set of positions on the screen of the device, wherein each entry key corresponds to a symbol, a number, a letter, or a character;
collect a first set of tracking data including respective first positions, from the first set of positions, of entry keys used for entry of a first password;
display a second keypad on the screen of the device, the second keypad comprising the set of entry keys of the device displayed in a second set of positions on the screen of the device;
determine a second password based on entry keys displayed in the second set of positions that correspond with the respective first positions of entry keys used for entry of the first password;
determine whether the second password was entered into the device; and
implement a security action in response to determining entry of the second password.

16. The computer program product of claim 15, wherein the first set of tracking data includes time data and location data, and wherein the second password is a likely password that an observer of entry of the first password in the first set of positions is likely to enter into the device.

17. The computer program product of claim 15, further comprising computer readable program code configured to:
collect a second set of tracking data including time data and location data for entry of the second password; and
select, in response to determining that the second password was entered into the device, the security action based on the time data and location data of the second set of tracking data.

18. The computer program product of claim 17, wherein the security action includes enabling a tracking application configured to transmit global-positioning coordinates to a security management server.

19. The computer program product of claim 17, further comprising computer readable program code configured to:
identify, based on the second set of tracking data, potentially targeted users within a threshold distance of an entry location of the second password; and
alert, using a phone communication, the potentially targeted users of the entry of the second password.

20. The computer program product of claim 19, further comprising computer readable program code configured to:
identify, using a wireless provider database, individuals sharing a wireless provider plan with the potentially targeted users; and
alert, using a phone communication, the identified individuals of the entry of the second password.

* * * * *